July 22, 1947.   W. D. CRATER   2,424,436
PIPE COUPLING
Filed April 13, 1945   2 Sheets-Sheet 1

Inventor:
Wilbur D. Crater,
by Harry E. Dunham
His Attorney.

July 22, 1947.                     W. D. CRATER                     2,424,436
                                   PIPE COUPLING
                              Filed April 13, 1945                 2 Sheets-Sheet 2
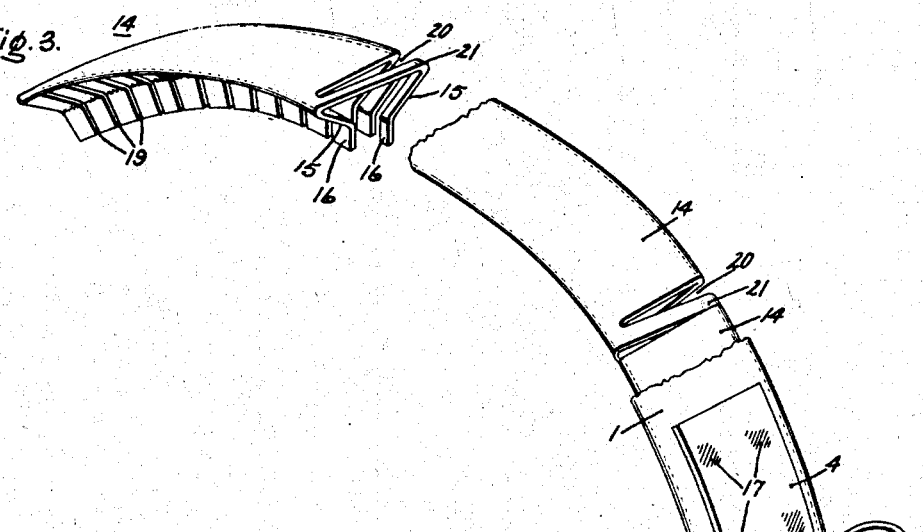
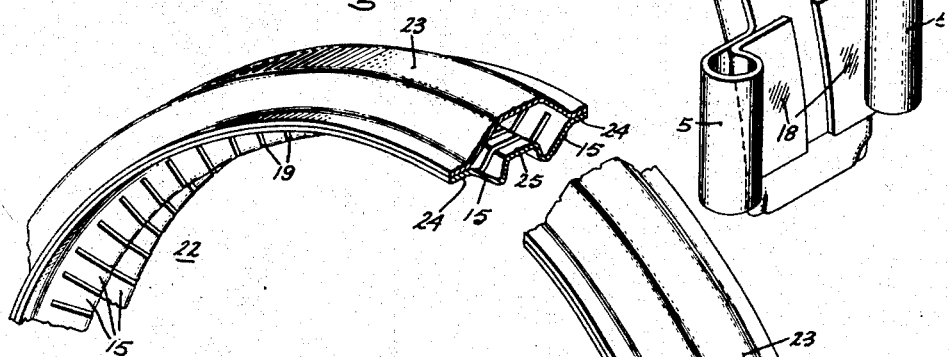
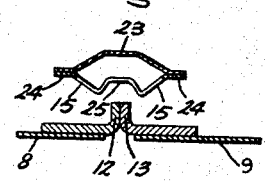 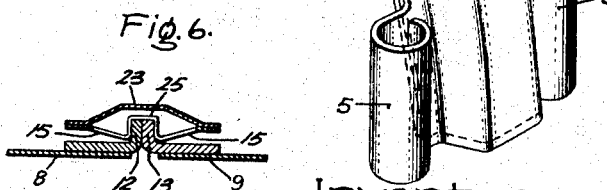
Inventor:
Wilbur D. Crater,
by Harry E. Dunham
His Attorney.

Patented July 22, 1947

2,424,436

UNITED STATES PATENT OFFICE 2,424,436

PIPE COUPLING

Wilbur D. Crater, Peabody, Mass., assignor to General Electric Company, a corporation of New York Application April 13, 1945, Serial No. 588,132

6 Claims. (Cl. 285—129)

1

This invention relates to pipe couplings, particularly simple couplings which may be quickly and easily installed and disassembled and which can be used repeatedly.

An object of the invention is to provide a simple light-weight coupling especially suitable for thin-walled conduits made of sheet metal.

A further object is to provide a coupling capable of producing very great axial forces by toggle action to hold the conduit sections together, while requiring the application of a minimum force in making up the coupling to produce the desired axial forces on the pipe ends.

Another object is the reduction of the friction forces between the moving parts of a toggle-type pipe connection.

A still further object is the provision of a unitary coupling device which is easy to install and disassemble in inaccessible locations and where space is at a premium.

Another object is to produce a pipe coupling which can be progressively tightened, within limits, if the conditions encountered in service tend to cause loosening of the coupling or leakage through the pipe joint.

Another object is the provision of a resilient pipe coupling device having no parts which are permanently deformed in use, so that it can be disassembled and re-used repeatedly without replacement or repair of any parts.

Figure 1:
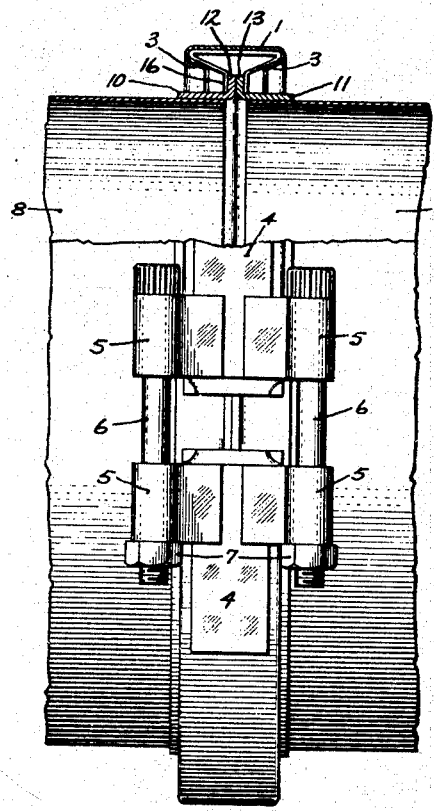
Figure 2:
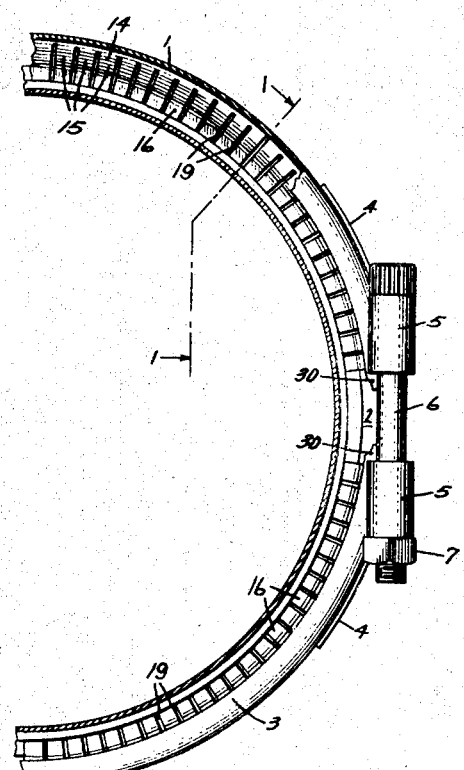

Further objects and advantages will be apparent from the following description and the appended claims taken in connection with the accompanying drawings, in which Fig. 1 is a side view, partly in section, of a pipe joint embodying a coupling made in accordance with my invention; Fig. 2 is a front view, also partly in section, of the joint shown in Fig. 1; Fig. 3 is a perspective view, partly broken away, of the coupling shown in Figs. 1 and 2; Fig. 4 is a perspective view, partly broken away, of a modified form of my invention; and Figs. 5 and 6 are sectional views illustrating the method of operation of the modification shown in Fig. 4.

In Fig. 1 the cylindrical conduit end portions 8 and 9, represented as thin-walled pipe made of sheet metal, are provided with circumferentially extending flanges 10 and 11, represented as separate rings L-shaped in cross section and having one leg welded to the end of the pipe section while the other legs form radially extending flanges 12 and 13 adapted to be engaged by my pipe coupling. The coupling consists of a band 1 split at the location 2 and having circumferential edge portions 3 bent radially inwardly and axially towards each other. The ends of the split band 1 have welded thereto attachment members 4, each of which is provided with two axially spaced cylindrical lugs 5 arranged at either side of the band 1 with the center-lines of the cylindrical openings through the lugs lying as nearly as possible in a plane tangent to the band 1 at the location 2. Suitable threaded fastenings such as the socket head bolts 6 are disposed through the lugs so that the attachment members 4 can be drawn together by tightening the nuts 7. Round socket head bolts are advantageous because square nuts can then be used, so arranged that the corners engage the band and hence no wrench need be applied to the nuts. Tightening is done merely by turning the bolt head. With this arrangement of the threaded fastenings, the line of action of the tension forces produced by the bolts 6 is in or as close as possible to the plane of the ends of the split band 1; therefore there is no bending moment exerted on the split ends tending to move them radially inward so as to bind on the pipe flanges 10, 11. Such bending moments, if present, would produce excessive friction which would make the coupling difficult to install.

Slidably disposed within the circumferential channel defined by the band 1 and the depending edge portions 3 are a number of segmental members 14 provided with two circumferential rows of resilient finger portions 15, each of which extends radially inward and axially towards a corresponding finger in the other row. Each finger has an end portion 16 arranged to engage the outer face of one of the radially extending flanges 12, 13.

The structure of the band 1, attachment member 4, and resilient segments 14 can be better seen in the perspective view of Fig. 3. The attachment member 4 may be secured by spot-welds 17 to the band 1, and the lugs 5 may be formed by laterally extending portions bent around and spot welded to the member 4 at 18. The lugs 5 may be further bent backward, from the position represented in Fig. 3, so that the center line of the lugs is exactly in a plane tangent to the band 1. Each segment 14 may be made by making suitable saw cuts in the edges of a flat piece of sheet metal and then bending it up to the cross section illustrated in Fig. 1. At one or both ends of each segment 14 an additional cut 20 is made so as to produce the resilient end portion 21, which is slightly bent circumferentially away from the rest of the segment 14. It will be seen that this resilient end portion 21 resiliently abuts against an end of the adjacent segment 14 so as to space the segments 14 slightly apart before the bolts 6 are drawn up, while permitting some circumferential readjustment and compression of the segments 14 as the fastenings 6 are tightened up. This provision for some circumferential movement of the segments 14 relative to the band 1 helps to reduce the friction forces generated when the coupling is being tightened up, thereby making installation easier. The edges of the band 1 at the ends adjacent the split 2 may be crimped as at 30 in Fig. 2 to prevent the segments 14 sliding out of the band 1.

It will be observed that the band 1 holding the resilient segments 14 is a self-contained unit which can conveniently be handled without danger of losing any of the component parts from the assembly. When the coupling is used to connect thin-walled pipes made of sheet metal, the parts of the coupling may also be made of comparatively thin resilient sheet metal such as stainless steel.

If the coupling is made of thin resilient sheet metal as suggested, then it needs to be split at only one place, the location 2, its resiliency permitting the split ends to be opened up sufficiently to be slipped around the flanges 12, 13. The bolts 6 are then inserted through the lugs 5 and the nuts 7 assembled. Turning bolts 6 by a tool inserted in the socket head produces a circumferential hoop tension in the band 1 causing it to contract. It will be seen from a consideration of the cross section of the coupling shown in Fig. 1 that contraction of the band 1 causes the resilient fingers 15 to be deflected toward the band 1, producing a toggle action which causes the finger end portions 16 to be forced tightly into axial engagement with the sides of the flanges 12, 13. By reason of this toggle action, the moderate force exerted by the fastening devices 6 is capable of producing very considerable axial force securing the pipe flanges 12, 13 together. Also with the toggle action, each increment of motion of the lugs 5 towards each other produces a greater axial tightening force on flanges 12 and 13 than did the preceding increment.

It will be obvious that any suitable type of gasket (not shown) may be inserted between the flanges 12, 13 before the coupling is assembled. However, the effectiveness of the coupling is such that for many applications no gasket may be needed.

It will be seen that the coupling represented by Figs. 1, 2 and 3 is a simple, light-weight, unitary assembly which can be handled and installed with great convenience. A further advantage is that if some leakage should occur through the pipe flanges 12, 13 in service, the bolts 6 can be drawn up tighter to increase the force between the pipe flanges and stop the leakage. The coupling can be progressively tightened until when the absolute limit is reached the inner circumference of the segments 14 is contracted substantially into contact with the outer circumference of the flanges 12, 13 with the finger portions 15 substantially flat against the under side of the segments 14.

It should be noted that in normal use none of the parts of the coupling are permanently deformed. When the fastenings 6 are released and the coupling removed from the pipes 8, 9, all parts resiliently return to approximately their original condition. Therefore the coupling can be installed and disassembled repeatedly without depreciation of the efficacy of the device.

It may also be noted that this coupling is comparatively easy to tighten up because there is a minimum of rubbing contact between relatively moving parts of the assembly, most of the necessary relative movement being accommodated by resilient deflection of the members. Relative axial movement of the flanges 12, 13 is accompanied by resilient deflection of the fingers 15, while circumferential movement of the segments 14 relative to each other and to the band 1 are accompanied by deflection of the resilient end portions 21. Because of the reduction in the friction forces produced in tightening up the coupling, it can be formed as a single assembly split and provided with fastening devices 6 at only one place (2 in Fig. 2).

My coupling is particularly well adapted for use in power-plant installations in aircraft, where an enormous quantity of mechanical equipment must be compressed into the smallest possible space while still permitting maximum ease of accessibility to the various components for maintenance and service purposes. My coupling can be readily spread apart and slipped around a pipe joint so located in a power plant installation that the joint is accessible at only one small portion of its circumference. The ease with which this coupling is made up and disassembled makes it particularly adaptable to aircraft power-plants where it is desired to be able to quickly remove components from the installation for repair and replacement.

My coupling is readily adaptable to such applications as the air intake ducts of an aircraft power-plant, as well as the conduits used for the hot products of combustion from an engine. It can readily be produced in a wide range of sizes, being equally adaptable to small diameter exhaust stack joints and very large joints, as for instance the discharge conduit of an aircraft jet propulsion engine.

In the modification of my pipe coupling shown in Figs. 4, 5, and 6, the outer band 23 is formed with an inverted U cross section, and the resilient segments 14 of Fig. 3 are replaced by a single inner band 22 having edge portions 24 welded to corresponding edge portions of the outer band 23. The band 22 has a substantially W-shaped cross section with the mid-portion forming an inverted U-shaped bridge 25 arranged to straddle the outer edges of the pipe flanges 12, 13 in the manner shown in Fig. 6. The resilient finger portions 15 are formed by the saw cuts 19, as in the modification of Figs. 1 to 3 inclusive.

The method of operation of this form of my coupling will be clear from a consideration of Figs. 5 and 6. The coupling is placed around the pipe flanges 12, 13 and as the fastening devices are drawn up the bridge portion 25 engages the outer circumference of the flanges, after which the toggle action of the fingers 15 forces the side portions of the U-shaped bridge 25 into engagement with the outer faces of the flanges 12, 13.

While I have illustrated a particular form of fastening device (bolts 6 and lugs 5) for drawing together the ends of the coupling assembly, it will be apparent that toggle type hasps such as used in trunk lids and many other kinds of fasteners may be used.

It will be seen that my invention provides a simple, light-weight, unitary pipe coupling which can be easily applied, re-tightened in service, readily removed, and repeatedly re-used.

What I claim as new and desire to secure by Letters Patent of the United States is:

1. A re-usable quick-detachable coupling for two pipe sections having circumferential flanges at the abutting ends, comprising a split clamp band assembly including two parallel axially spaced annular rows of resilient finger portions, each finger making an acute angle with the plane of the band and each having an end portion in axially spaced opposed relation to the end portion of a corresponding finger in the other row, and adjustable securing means associated with the ends of the clamp band and arranged to produce hoop tension in the band so that the end portions of the fingers in the two rows can be forced axially against the respective outer faces of the pipe flanges to clamp the flanges tightly together by toggle action of the fingers.

2. A re-usable quick-detachable coupling for two pipes having circumferential flanges at the abutting ends, comprising a split band assembly including two parallel axially spaced annular rows of resilient finger portions, each finger extending in an inclined direction radially inward and axially toward the other row, and fastening means associated with the ends of the split band and arranged to produce hoop tension in the band so that the radially inward portions of the resilient fingers can be forced into engagement with the outer faces of abutting pipe flanges to securely clamp the flanges together by toggle action of the fingers.

3. A re-usable quick-detachable coupling for two pipe sections having circumferential flanges at the abutting ends, comprising a split outer band with circumferential edge portions extending radially inward and towards each other, a plurality of arcuate segments held in the circumferential channel formed by the outer band, each segment having two axially spaced rows of resilient finger portions formed integral with the segment, each finger extending in an inclined direction radially inward and axially toward the other row, the fingers in both rows having end portions adapted to engage the respective outer faces of the pipe flanges, and adjustable securing means associated with the ends of the split outer band and arranged to produce hoop tension to cause contraction of the band so that the end portions of the two rows of opposing fingers can be forced axially against the respective outer faces of the pipe flanges to clamp the flanges tightly together by toggle action of the fingers.

4. A re-usable quick-detachable coupling for two pipe sections having circumferential flanges at the abutting ends, comprising a split outer band with circumferential edge portions extending radially inward and towards each other, a plurality of arcuate segments held in the circumferential channel formed by the outer band, each segment having two axially spaced rows of resilient finger portions formed integral with the segment, each finger extending in an inclined direction radially inward and axially toward the other row, the fingers in both rows having end portions adapted to engage the respective outer faces of the pipe flanges, each segment having also a resilient end portion arranged to engage the abutting end of the next adjacent segment so as to space the segments while permitting limited circumferential contraction of the outer band, and adjustable securing means associated with the ends of the split outer band and arranged to produce hoop tension to cause contraction of the band so that the end portions of the two rows of opposing fingers can be forced axially against the respective outer faces of the pipe flanges to clamp the flanges tightly together by toggle action of the fingers.

5. A re-usable quick-detachable coupling for two pipe sections having circumferential flanges at the abutting ends, comprising an inner split band with two axially spaced annular rows of resilient finger portions formed integral with the band and each extending in an inclined direction radially inward and axially toward the other row, an outer split band surrounding the inner band and secured thereto to form a unitary assembly, and fastening means associated with the ends of the outer split band and arranged to produce hoop tension so as to contract the bands and force the opposing radially inward portions of the resilient fingers into engagement with the outer faces of the abutting pipe flanges to securely clamp the flanges together by toggle action of the fingers.

6. A re-usable quick-detachable coupling for two pipe sections having circumferential abutting flanges, comprising an inner split band with a substantially W-shaped cross-section, the depending end portions of the W being shaped to define two axially spaced annular rows of resilient finger portions each finger extending in an inclined direction radially inward and axially toward the other row, the middle portion of the W forming a circumferential channel opening inwardly and adapted to surround and engage the edge and outer side portions of said abutting flanges, an outer split band surrounding the inner band and secured to the outer edges thereof to form a unitary assembly, and fastening means associated with the ends of the outer split band and arranged to produce hoop tension so as to contract the band and cause the U-shaped midportion of the inner band to firmly seat on the outer circumferential surfaces of the flanges and the resilient finger portions to force the flanges axially together by toggle action of the fingers.

WILBUR D. CRATER.

REFERENCES CITED

The following references are of record in the file of this patent:

UNITED STATES PATENTS

| Number | Name | Date |
|---|---|---|
| 1,937,881 | Fisher | Dec. 5, 1933 |

FOREIGN PATENTS

| Number | Country | Date |
|---|---|---|
| 165,262 | Great Britain | June 30, 1921 |